United States Patent [19]

Hoppert et al.

[11] Patent Number: 4,567,762

[45] Date of Patent: Feb. 4, 1986

[54] THERMOELECTRIC LEVEL DETECTOR AND A METHOD FOR ITS MANUFACTURE

[75] Inventors: Hans Hoppert, Selb; Dieter Busch, Rosbach; Fritz Sondermann, Willsbach; Fritz Stork, Zirndorf, all of Fed. Rep. of Germany

[73] Assignee: Telefunken electronic GmbH, Fed. Rep. of Germany

[21] Appl. No.: 350,178

[22] Filed: Feb. 19, 1982

[30] Foreign Application Priority Data

Mar. 10, 1981 [DE] Fed. Rep. of Germany ....... 3108969

[51] Int. Cl.[4] .................................................. G01F 23/24
[52] U.S. Cl. ................................... 73/304 R; 73/313; 338/38; 340/620
[58] Field of Search .............. 73/295, 313, 290 R, 73/304 R; 340/620; 338/27, 38, 80, 156, 822

[56] References Cited

U.S. PATENT DOCUMENTS

| | | | |
|---|---|---|---|
| 1,532,871 | 4/1925 | Bloch | 73/304 R X |
| 1,667,612 | 4/1928 | Thompson | 338/38 |
| 1,942,241 | 1/1934 | Duhme | 73/295 X |
| 2,456,617 | 12/1948 | Burch | 338/38 X |
| 2,468,676 | 4/1949 | Liben | 73/295 X |
| 2,612,047 | 9/1952 | Nilsson et al. | 338/27 |
| 2,894,390 | 7/1959 | Talbot | 73/295 |
| 3,246,276 | 4/1966 | Miehe | 338/80 X |
| 3,479,875 | 11/1969 | Riddel | 73/295 |
| 3,485,100 | 12/1969 | Petersen | 73/295 |
| 3,511,090 | 5/1970 | Erhrenfried et al. | 338/13 |
| 4,129,848 | 12/1978 | Frank et al. | 73/295 X |
| 4,226,899 | 10/1980 | Thiel et al. | 29/620 |
| 4,345,235 | 8/1982 | Riley et al. | 29/620 X |
| 4,359,372 | 11/1982 | Nagai et al. | 29/620 X |
| 4,382,246 | 5/1983 | Hansson et al. | 29/612 X |
| 4,461,175 | 7/1984 | Baumgart et al. | 73/295 |

FOREIGN PATENT DOCUMENTS

| 1932175 | 1/1970 | Fed. Rep. of Germany | 338/13 |
|---|---|---|---|
| 2094983 | 9/1982 | United Kingdom | 73/295 |

*Primary Examiner*—Daniel M. Yasich
*Attorney, Agent, or Firm*—Spencer & Frank

[57] ABSTRACT

A thermoelectric level detector employs an impedance element, at least a portion of which is meandering in configuration in which the resistive path repeatedly traverses the axis thereof, to detect the level of liquid in a tank. The impedance of the element depends on temperature and provides a measure of the liquid level. The pitch of the meander is relatively small in the reserve region of the tank to provide fine resolution in this region.

26 Claims, 16 Drawing Figures

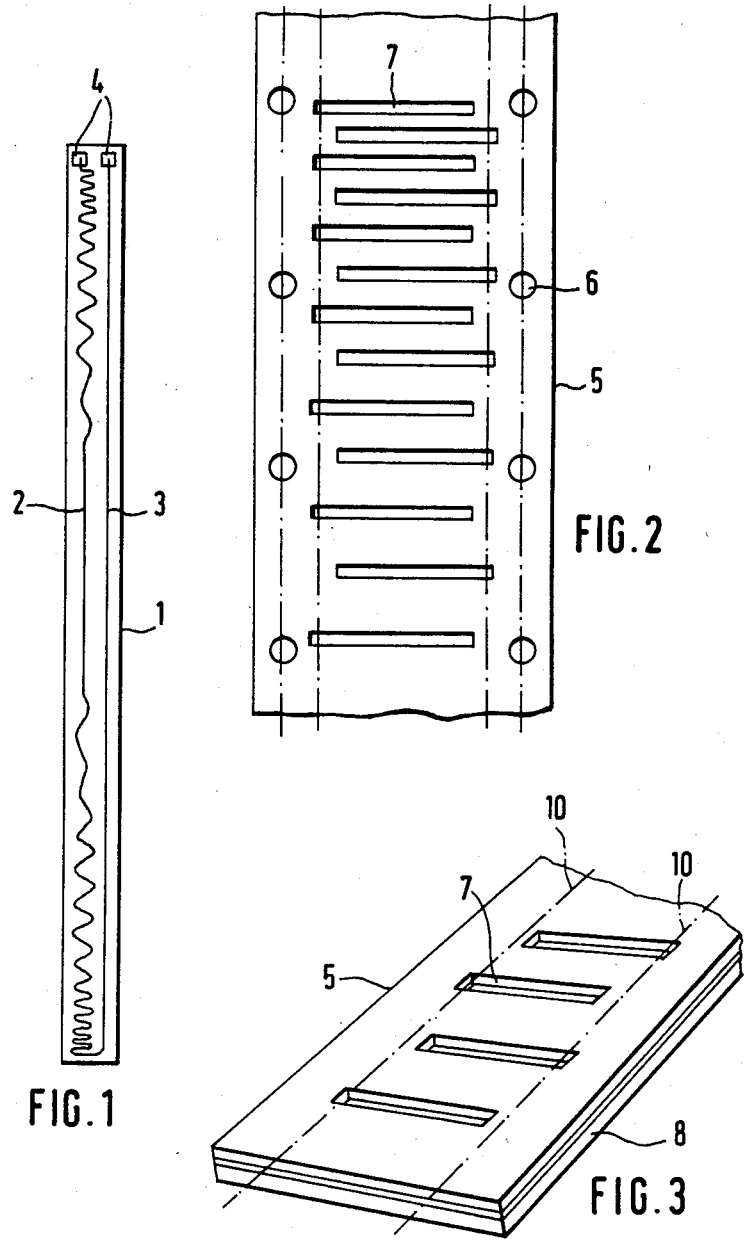

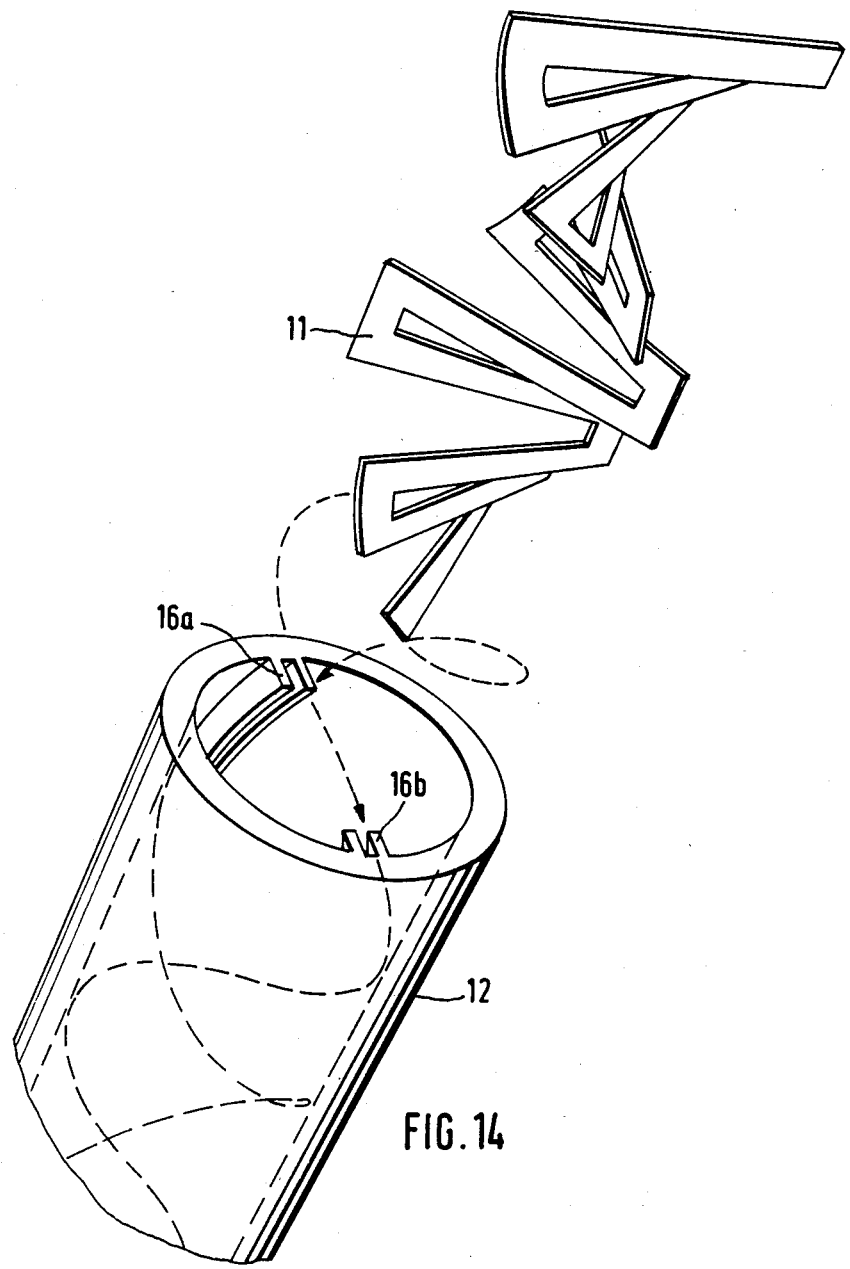

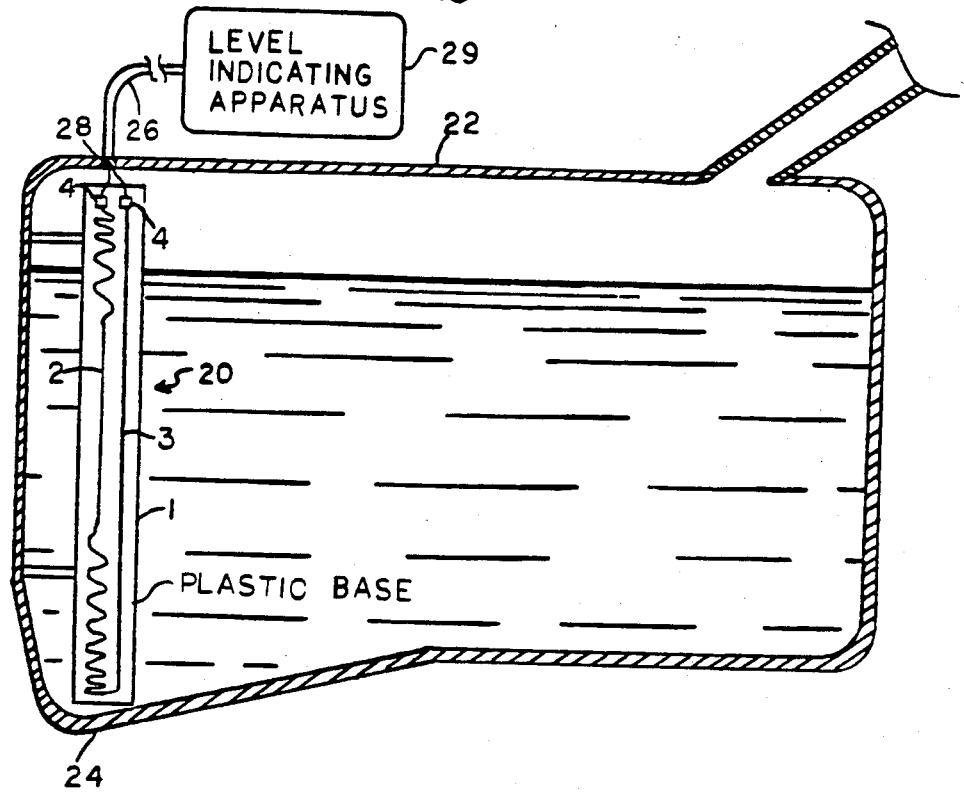

THERMOELECTRIC LEVEL DETECTOR AND A METHOD FOR ITS MANUFACTURE

BACKGROUND OF THE INVENTION

The invention relates to a thermoelectric level detector and more particularly to a tank level indicator, for use in vehicles, for example. The level indicator has a current carrying impedance path, the impedance of which depends on temperature and is a measure of the liquid level which is to be ascertained. The impedance value which depends on the liquid level is generally measured in such a device and is converted preferably electronically into an indication of the level.

More particularly, an important feature of such a thermoelectric level detector is that there is a resistance path through which current flows, a predetermined voltage dropping across said resistance path as the current flows therethrough. This voltage depends on cooling by the liquid. The higher the level of liquid to be detected, the more liquid there is and the greater is the cooling of the resistance path. The resistance of the path depends on temperature so that the path voltage depends on the cooling and therefore on the level of the liquid surrounding it, so that the detected voltage can be used to give an indication of the liquid level. This use of a resistance path in a thermoelectric level detector is known in the art and is described, for example, in U.S. Pat. No. 1,942,281, issued on Jan. 2nd, 1934 to Emil Duhme, which is incorporated herein by reference.

SUMMARY OF THE INVENTION

An object of the invention is to provide a thermoelectric level indicator of the above type which has a quasi stepless resolution and which may be relatively thin and may be manufactured simply and cheaply.

According to the invention there is provided a thermoelectric level detector comprising an impedance element, the impedance of said element being dependent on temperature and being a measure of the level which is to be detected, said impedance element following a path that is at least partially meandering in configuration.

The turns of the at least partially meandering path in accordance with the invention may have a rectangular, saw tooth or sinusoidal shape, for example.

In accordance with modifications of the invention the pitch of the at least partially meandering path, i.e. the spacing between the turns, is variable. When a tank of liquid is used, the pitch is preferably adapted to the shape of the tank.

BRIEF DESCRIPTION OF THE DRAWINGS

FIG. 1 shows a first embodiment of the present invention;

FIG. 2 shows an element used in the manufacture of a second embodiment of the present invention;

FIG. 3 shows a step in the manufacture of the second embodiment;

FIG. 14 shows a tenth embodiment of the present invention; and

FIG. 15 is a sectional view of an embodiment of the level detector of the present invention affixed in a tank.

DESCRIPTION OF THE PREFERRED EMBODIMENTS

Figure 4:
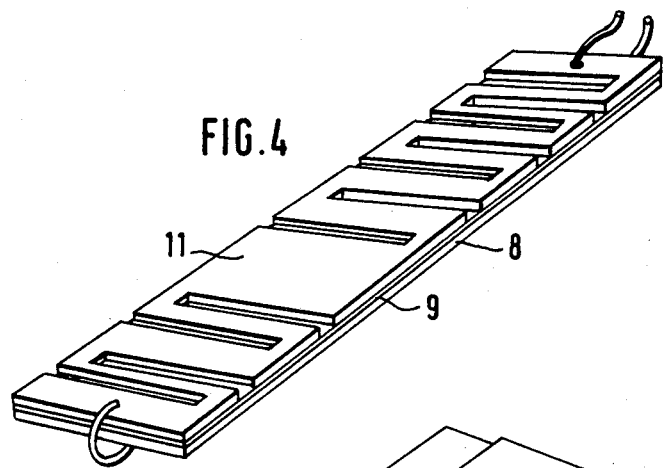
FIG. 4 shows the second embodiment, when manufactured.

Referring now to the drawings, FIG. 1 shows a first embodiment of the invention in which a layer of metal or metal alloy, which has a large temperature coefficient of impedance, is vapour deposited, sputtered, adhered or coated on to a flexible base member 1 in order to produce a meandering impedance path 2. The term "meandering" is used here in its ordinary sense, and means that the path turns back and forth. Member 1 may be approximately 5 mm wide and approximately 250 mm long and comprise a plastics material which may be resistant to solvent. The impedance path 2, at least a portion of which is meandering in configuration, is produced photolithographically from this metal layer and is provided with a return conductor 3. In order to avoid encumbering the following description with repeated reminders that the path may also include straight portions, as in FIG. 1, it will be understood that the term "meandering" in the rest of the specification is used to refer to configurations that include substantial meandering portions but that may also include portions that do not meander. Connection surfaces 4 are located at the two ends of the impedance path 2. The meandering impedance path 2 has a variable pitch, or a denser number of turns at the top and bottom portions of the flexible base member 1 than at the central portion thereof. In particular the individual meandering turns have a relatively small pitch at the bottom portion of the base member 1 in the critical reserve region of the tank so that the ratio of the change in impedance and the change in level in the reserve region is larger than said ratio of the change in impedance and the change in level at, for example, the middle of the tank. The return conductor 3 may follow a straight line and/or conform to the meandering impedance path 2. In the embodiment of FIG. 1 the meandering impedance path 2 is a thin film impedance in which the impedance value is converted electronically into an indication of the level. The thin film impedance has by way of example a temperature coefficient of up to $6000 \times 10^{-6} \text{deg}^{-1}$.

In the embodiment of FIG. 2, the impedance path is produced from a self-supporting elongate metal foil 5 which has guide orifices 6 fixed at both edges, into which an advance device may engage. Laterally alternately offset transverse slots 7 are etched or stamped into the metal foil 5, which by way of example is between 5 and 20 μm thick. The metal foil 5, which is structured in this way, is adhered to a base provided by a thin, flexible plastic foil 8 as shown in FIG. 3. After the layer 9 (FIG. 4) of adhesive has hardened, the layer formation comprising the base foil 8 and the metal foil 5 is separated along the two cutting lines 10 which lie between the offset ends of the transverse slots 7 so that a meandering impedance path 11 is provided on the base foil 8 as shown in FIG. 4, said impedance path being produced from a metal or metal alloy foil. The plastics foil and the adhesive 9 are resistant to the liquid the level of which is to be measured, e.g. petrol, benzine, bensole, methanol etc.

The meandering impedance path 11 preferably has a variable pitch which is adapted to the shape of the tank and a relatively small pitch for the individual meandering turns particularly in the critical reserve region of the tank in order that the ratio of the change in impedance and the change in fill height is relatively large.

Figure 5:
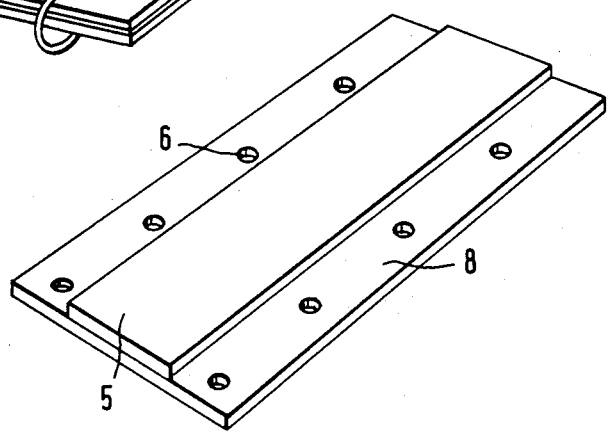
FIG. 5 shows an element used in the manufacture of third and fourth embodiments of the present invention.
Figure 6:
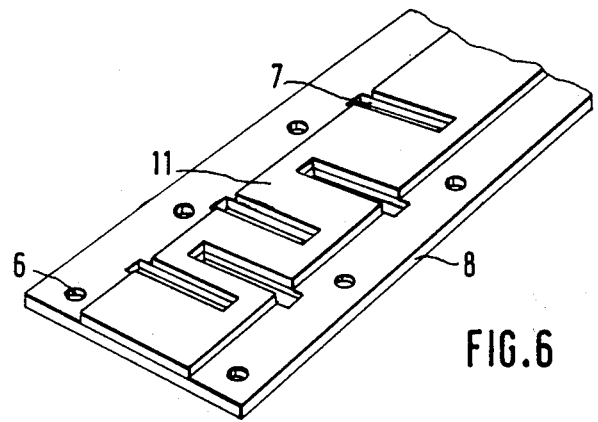
FIG. 6 shows the third embodiment, when manufactured.
Figure 7:
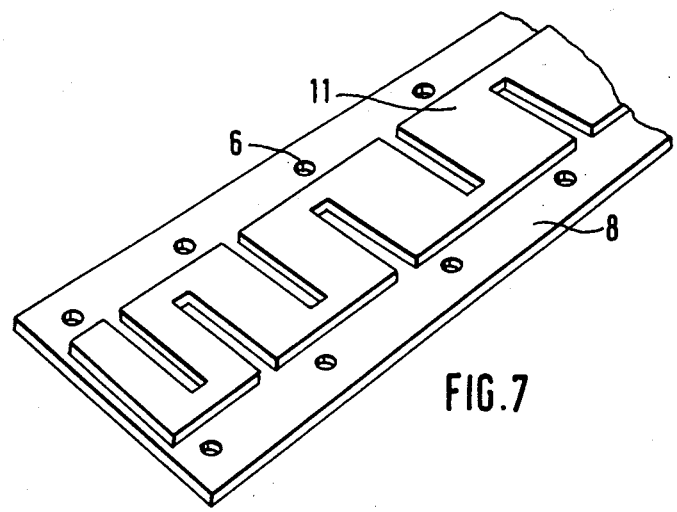
FIG. 7 shows the fourth embodiment, when manufactured.

FIG. 5 shows a base 8 preferably comprising plastic material and having an applied metal foil 5 which has not yet assumed the shape of the desired impedance path. The guide orifices 6 present in the base 8 serve to engage an advance device. As shown in FIG. 6 and 7, alternatively transverse slots or gaps 7 which are laterally offset from each other are inserted into the metal foil 5 which has a thickness of between 5 and 20 $\mu$m for example. In the embodiment of FIG. 6 the transverse slots 7 are produced by stamping and in the embodiment of FIG. 7 by etching. As shown in FIGS. 6 and 7 the transverse slots 7 provide a meandering impedance path 11 on the base foil which path 11 preferably has a temperature coefficient of its impedance of up to $6000 \times 10^{-6} \text{deg}^{-1}$.

Figure 8:
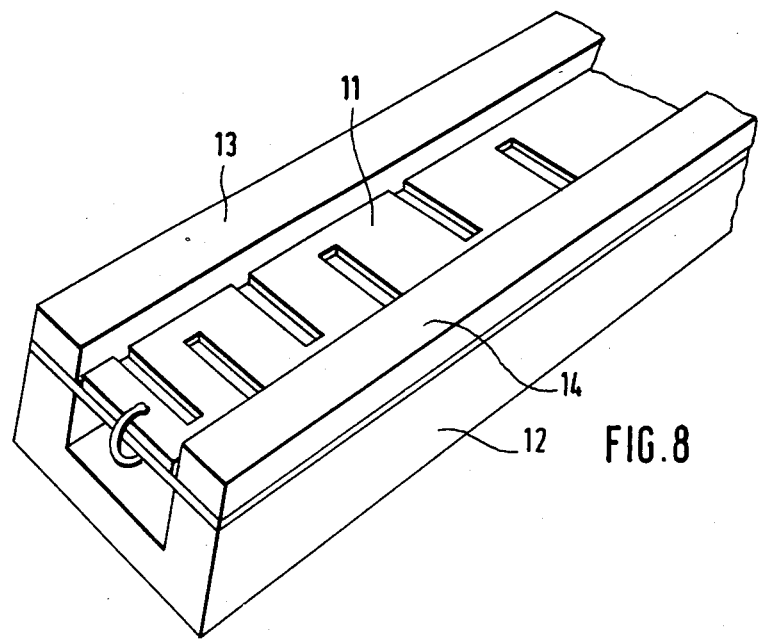
FIG. 8 shows a fifth embodiment of the present invention.

FIG. 8 shows a carrier member 12 with a U-shaped cross-section. This carrier member has perforations in its case area (not shown) which have the shape of circular orifices, slits or grid for example. A meandering impedance path 11, to the beginning and end of which connecting wires are respectively connected, is located between and on the two limbs of the U-shaped carrier member 12. The meandering impedance path 11 is connected to the limbs of the carrier member 12 by means of profiled strips 13, 14. The preformations in the carrier member make is possible for the liquid, the level of which is to be measured, to reach the impedance path, the electrical resistance being measured between the two connecting wires.

Figure 9A:
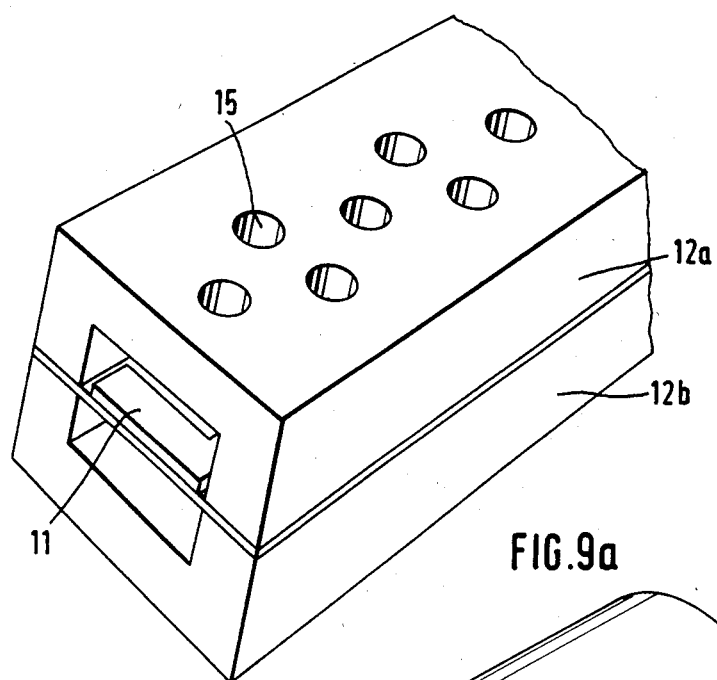
FIGS. 9a and 9b shows sixth and seventh embodiments of the present invention.
Figure 9B:
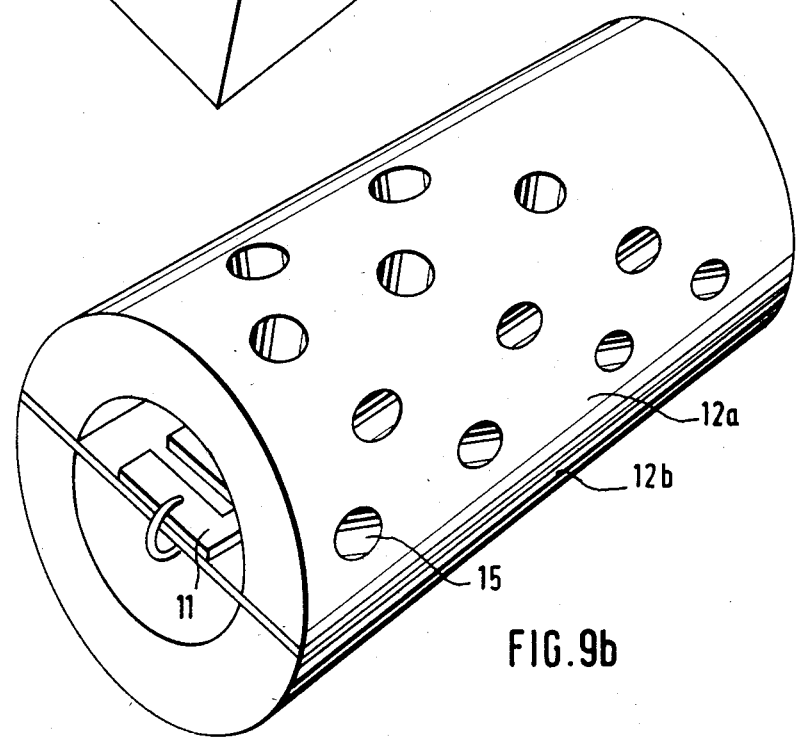

In the arrangement of FIG. 9, a meandering impedance path 11 is clamped and fixed between two carrier members 12a and 12b which are mirror images of each other. While the carrier members 12a and 12b in FIG. 9a have a U-shaped cross-section the two carrier members in FIG. 9b are semi-cylindrical or channel-like in cross-section. The perforations 15 present in FIGS. 9a and 9b also serve to allow the liquid, the level of which is to be measured, to reach the impedance path.

Figure 10:
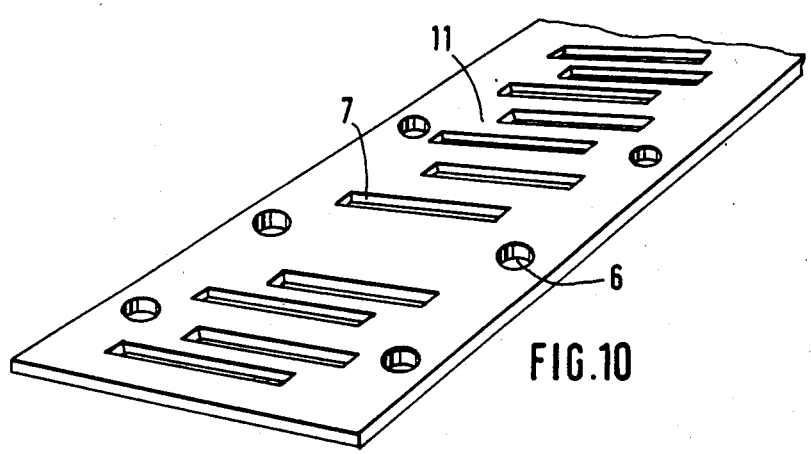
FIG. 10 shows an element used in the manufacture of an eighth embodiment of the present invention.
Figure 11:
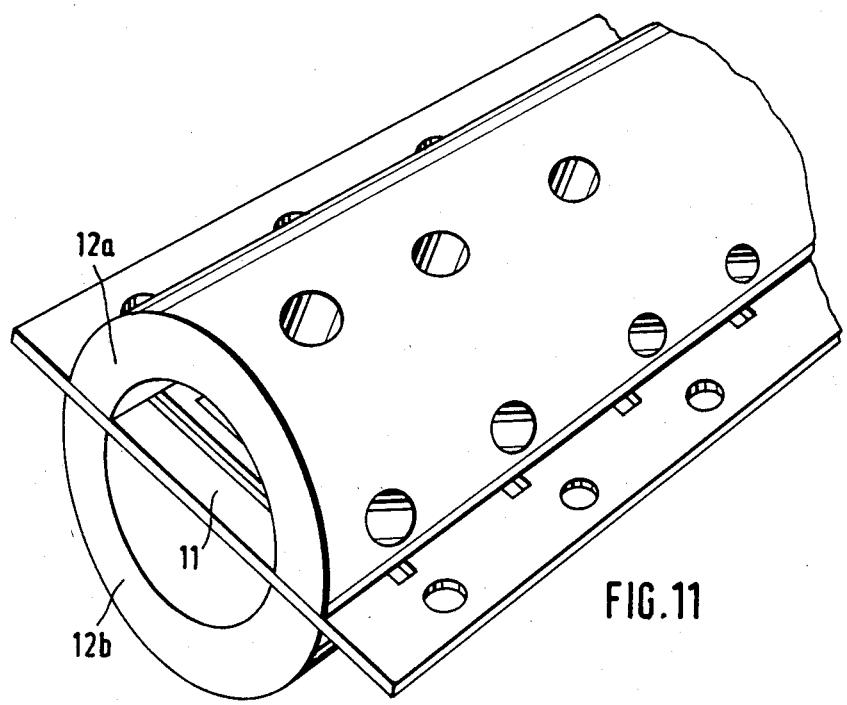
FIGS. 11 and 12 show successive stages of the manufacture of the eight embodiment.
Figure 12:
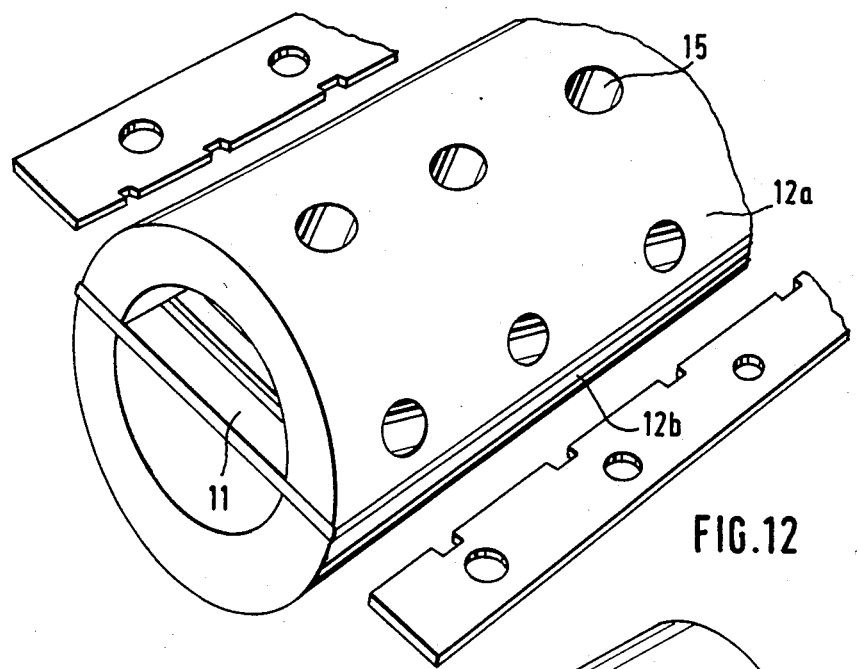

FIGS. 10 to 12 show an embodiment of the invention in which a self-supporting metal foil is used for the impedance path so that a base foil is not needed for the metal foil. As shown in FIG. 10, transverse slots 7 are etched or stamped into a metal foil 11 as in preceding embodiments in order to produce the impedance path. The metal foil 11 provided with a transverse slot 7 is clamped between two carrier members 12a and 12b as shown in FIG. 11. The metal foil is finally severed along the cutting lines 10 in order to produce the finished impedance path. FIG. 12 shows the finished impedance path 11, clamped between the two carrier members 12a and 12b.

Figure 13:
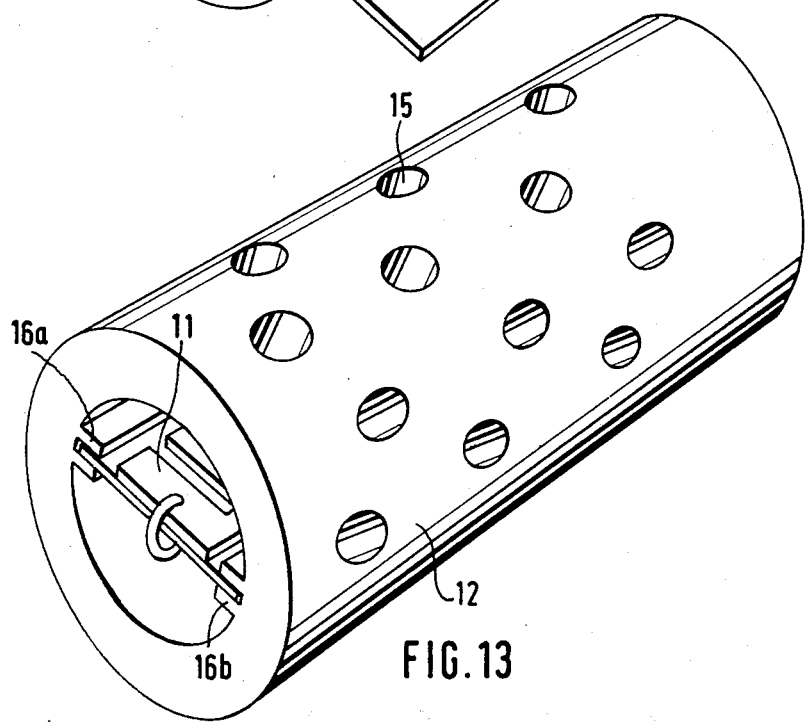
FIG. 13 shows a ninth embodiment in accordance with the present invention.

FIG. 13 hows an embodiment of the invention in which the impedance path 11 is mounted by means of two grooves 16a and 16b. The impedance path 11 has a lateral play in the two grooves and is more resiliently mounted than in the preceding embodiment. This more resilient mounting is designed to prevent the impedance path 11 from being destroyed or damaged if the tank indicator is incorporated into the tank. There is a danger of this, if the cross-section of the tank feed pipe is smaller than the cross-section of the indicator which is to be introduced into the tank, in which case it is only possible to introduce the tank indicator by compressing or twisting the indicator as it is introduced into the tank.

FIG. 14 shows another embodiment of the invention in which the impedance path 11 is generally helical and therefore particularly resilient. The helical impedance path 11 is inserted into the carrier member 12 and retained thereby in grooves 16a, 16b.

In FIG. 15 a level detector 20, having the embodiment illustrated in FIG. 1, is affixed within a fuel tank 22 having reserve portion 24. Wiring 26 connects contact surfaces 4 to level indicating apparatus 29 through fueled-type plug 28.

In the above described arrangements the turns of the meandering path may extend parallel to instead of or as well as perpendicular to the longitudinal axis of the base member 1 or strip 5. The impedance element may comprise nickel, copper, aluminium, iron or alloys thereof.

It will be understood that the above description of the present invention is susceptible to various modifications, changes and adaptations.

We claim:

1. A thermoelectric level detector for providing a continuous measurement of the level of a fluid, comprising:

an elongated impedance element having a vertically oriented axis, the impedance of said element being dependent on temperature and being a measure of the level of the fluid, said impedance element following a path provided by a resistive material that is disposed in a plane, wherein at least a portion of said path turns back and forth so that said path repeatedly traverses said axis, wherein the path has a densely turning bottom path portion, a densely turning top path portion, and a middle path portion connecting said bottom and top path portions, said middle path portion being one of substantially straight and turning with turns less dense than the turns of either of said bottom and top path portions, with the ratio of the change in impedance of the impedance element and the change of level of the fluid being greater at the top and bottom portions of said path than at the middle portion, and wherein said impedance element has a temperature coefficient ranging up to $6000 \times 10^{-6} \text{deg}^{-1}$;

two carrier members, said carrier members being mirror images of each other; and means for clamping said impedance element between said two carrier members with the top and bottom portions of the path being situated at respective top and bottom portions thereof.

2. A level detector as defined in claim 1, wherein the pitch of said at least a portion of said path that turns back and forth is variable.

3. A level detector as defined in claim 1, wherein said means for clamping comprises a base member to which said impedance element is affixed, said base member being disposed between said carrier members.

4. A level detector as defined in claim 3, wherein said base member is substantially longer than it is wide.

5. A level detector as defined in claim 3, wherein the turns of said at least a portion of said path that turns back and forth are generally parallel to or perpendicular to said axis of the impedance element.

6. A level detector as defined in claim 3, wherein the base member comprises plastic material.

7. A level detector as defined in claim 3, wherein said impedance element is adhered to said base member, coated onto said base member or stamped onto said base member.

8. A level detector as defined in claim 1, wherein said impedance element is a metal foil.

9. A level detector as defined in claim 1, wherein said impedance element is a thin film impedance element.

10. A level detector as defined in claim 1, wherein said impedance element comprises nickel, copper, aluminum, iron or alloys thereof.

11. A level detector as defined in claim 1, wherein each of said carrier members has a U-shaped cross-section.

12. A level detector as defined in claim 1, wherein each of said carrier members has a semi-cylindrical or channel-like cross-section.

13. A level detector as defined in claim 1, wherein said carrier members are perforated.

14. A tank for containing liquid, comprising a level detector as defined in claim 1 mounted in said tank, said tank having a reserve region and said bottom portion of said path being disposed in said reserve region of the tank.

15. A thermoelectric level detector for providing a continuous measurement of the level of a fluid, comprising:
an elongated impedance element having a vertically oriented axis, the impedance of said element being dependent on temperature and being a measure of the level of the fluid, said impedance element following a path provided by a resistive material that is disposed in a plane, wherein at least a portion of said path turns back and forth so that said path repeatedly traverses said axis, wherein the path has a densely turning bottom path portion, a densely turning top path portion, and a middle path portion connecting said top and bottom path portions, said middle path portion being one of substantially straight and turning with turns less dense than the turns of either of said bottom and top path portions, with the ratio of the change in impedance of the impedance element and the change of level of the fluid being greater at the top and bottom portions of said path than at the middle portion, and wherein said impedance element has a temperature coefficient ranging up to $6000 \times 10^{-6} \deg^{-1}$;
a U-shaped carrier member having two limbs; and
means for affixing said impedance element to said two limbs of the U-shaped carrier member with the top and bottom portions of the path being situated at respective top and bottom portions thereof.

16. A level detector as defined in claim 15, wherein said means for affixing comprises a base member to which said impedance element is affixed, said base member being disposed on said two limbs of said carrier members.

17. A level detector as defined in claim 16, wherein said base member is substantially longer than it is wide.

18. A level detector as defined in claim 16, wherein the turns of said at least a portion of said path that turns back and forth are generally parallel to or perpendicular to said longitudinal axis of the base member.

19. A level detector as defined in claim 16, wherein the base member comprises plastic material.

20. A level detector as defined in claim 16, wherein said impedance element is adhered to said base member, coated onto said base member or stamped onto said base member.

21. A level detector as defined in claim 15, wherein the pitch of said at least a portion of said path that turns back and forth is variable.

22. A level detector as defined in claim 15, wherein said impedance element is a metal foil.

23. A level detector as defined in claim 15, wherein said impedance element is a thin film impedance element.

24. A level detector as defined in claim 15, wherein said impedance element comprises nickel, copper, aluminum, iron or alloys thereof.

25. A level detector as defined in claim 15, wherein said means for affixing said impedance element comprises profiled strips.

26. A tank for containing liquid, comprising a level detector as defined in claim 15 mounted in said tank, said tank having a reserve region and said bottom portion of said path being disposed in said reserve region of the tank.

* * * * *